United States Patent [19]

Fischbeck et al.

[11] 4,032,929

[45] June 28, 1977

[54] HIGH DENSITY LINEAR ARRAY INK JET ASSEMBLY

[75] Inventors: Kenneth H. Fischbeck, Dallas; Richard H. Vernon, Richardson, both of Tex.

[73] Assignee: Xerox Corporation, Stamford, Conn.

[22] Filed: Oct. 28, 1975

[21] Appl. No.: 625,987

[52] U.S. Cl. .............................. 346/140 R; 310/8.3
[51] Int. Cl.[2] .............................. G01D 15/16
[58] Field of Search .............. 346/140, 75; 310/8.3, 310/9.1; 417/413

[56] References Cited

UNITED STATES PATENTS

| | | | |
|---|---|---|---|
| 3,452,360 | 6/1969 | Williamson | 346/140 |
| 3,747,120 | 7/1973 | Stemme | 346/140 X |

*Primary Examiner*—Joseph W. Hartary
*Attorney, Agent, or Firm*—Sheldon F. Raizes

[57] ABSTRACT

A high density linear array ink jet assembly is provided wherein a multiple chamber unit comprises a chamber housing and at least one flexible diaphragm spanning and sealing the chambers from each other and forming one wall of each chamber. A plurality of actuators for deforming the diaphragm are secured to the diaphragm at each chamber. The actuators are independently activated to deform the diaphragm for a particular chamber thereby decreasing the volume thereof to create a pressure on liquid ink therein. In one embodiment, a pair of elongated coextensive ribbon members are located opposite each other and are separated by a plurality of spaced ferrite walls secured thereto. At least one of the ribbon members comprises a deformable laminate of two layers of different material which have significantly different strain characteristics in the presence of a magnetic field. The ribbon members and each pair of ferrite walls form a deformable chamber whereby a plurality of deformable chambers are formed. A multiple ink jet nozzle unit is secured to the front of the chamber unit, and a reservoir unit is secured to the rear of the chamber unit. A reservoir inlet orifice and an ink droplet outlet orifice are associated with each chamber. A magnetic field is selectively applied to the deformable wall of various selected chambers to deform the wall thereof and thereby decrease the volume of the various chambers to express ink droplets from their outlet orifices onto a recording medium in accordance with an image to be produced. Other embodiments of multiple chamber units are disclosed which are of similar nature utilizing ribbon deformation by magnetostriction or by a piezoelectric member.

21 Claims, 10 Drawing Figures

FIG. 2
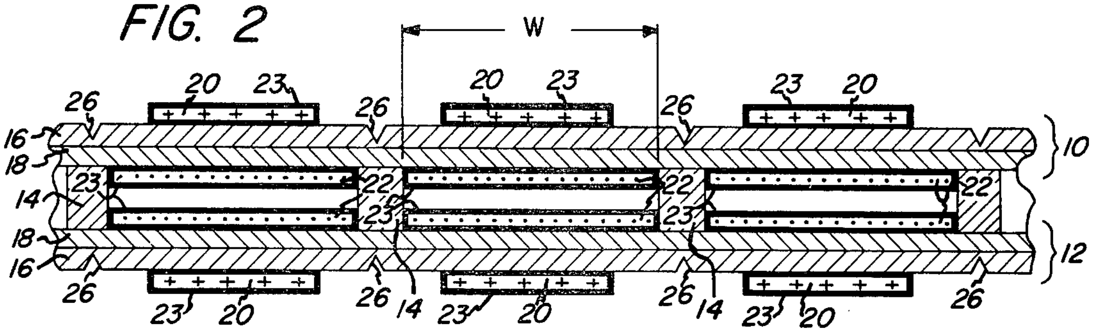
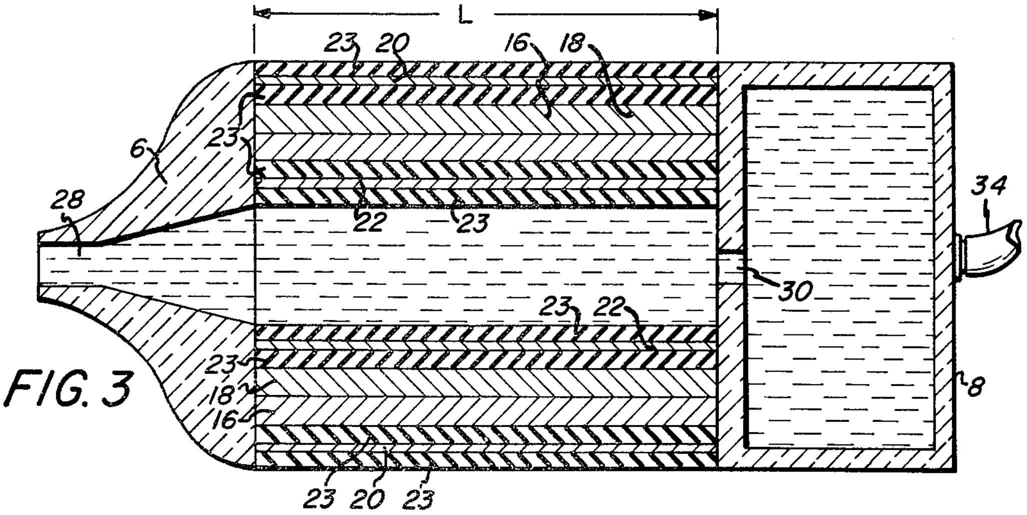
FIG. 3
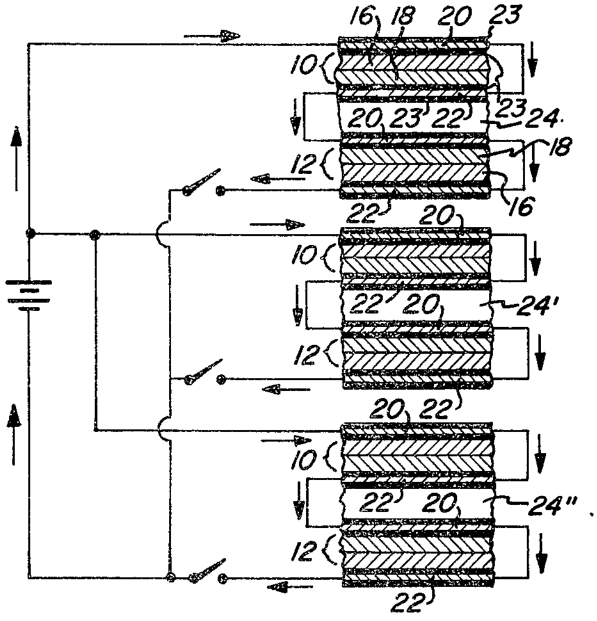
FIG. 4

HIGH DENSITY LINEAR ARRAY INK JET ASSEMBLY

DESCRIPTION OF THE INVENTION

This invention relates to a multiple ink jet printing system, which expresses droplets of liquid through certain ink jet orifices upon a demand, which is in accordance with an image to be printed.

In order to provide a printed image of high resolution, the outlet orifices of a multiple ink jet printing system must be spaced closely together in a high density array.

It is an object of this invention to provide a multiple ink jet printing system wherein the droplet orficies thereof are spaced closely together in a high density linear array.

It is a further object of the invention to provide a multiple ink jet printing system wherein a plurality of deformable chambers for expressing ink droplets through a respective orifice on demand are constructed as a unit in a high density linear array.

It is an overall object of this invention to provide a multiple ink jet printing system which is economical to manufacture, while still achieving a construction which has a linear array of droplet orifices closely spaced together for high resolution print quality.

Other objects of the invention will become apparent from the following description with reference to the drawings wherein:

FIG. 2 is a partial view of an ink jet assembly taken along section line 2—2 of FIG. 1;

FIG. 3 is a view of an ink jet assembly taken along section line 3—3 of FIG. 1;

FIG. 4 is a schematic electrical diagram;

Figure 1:
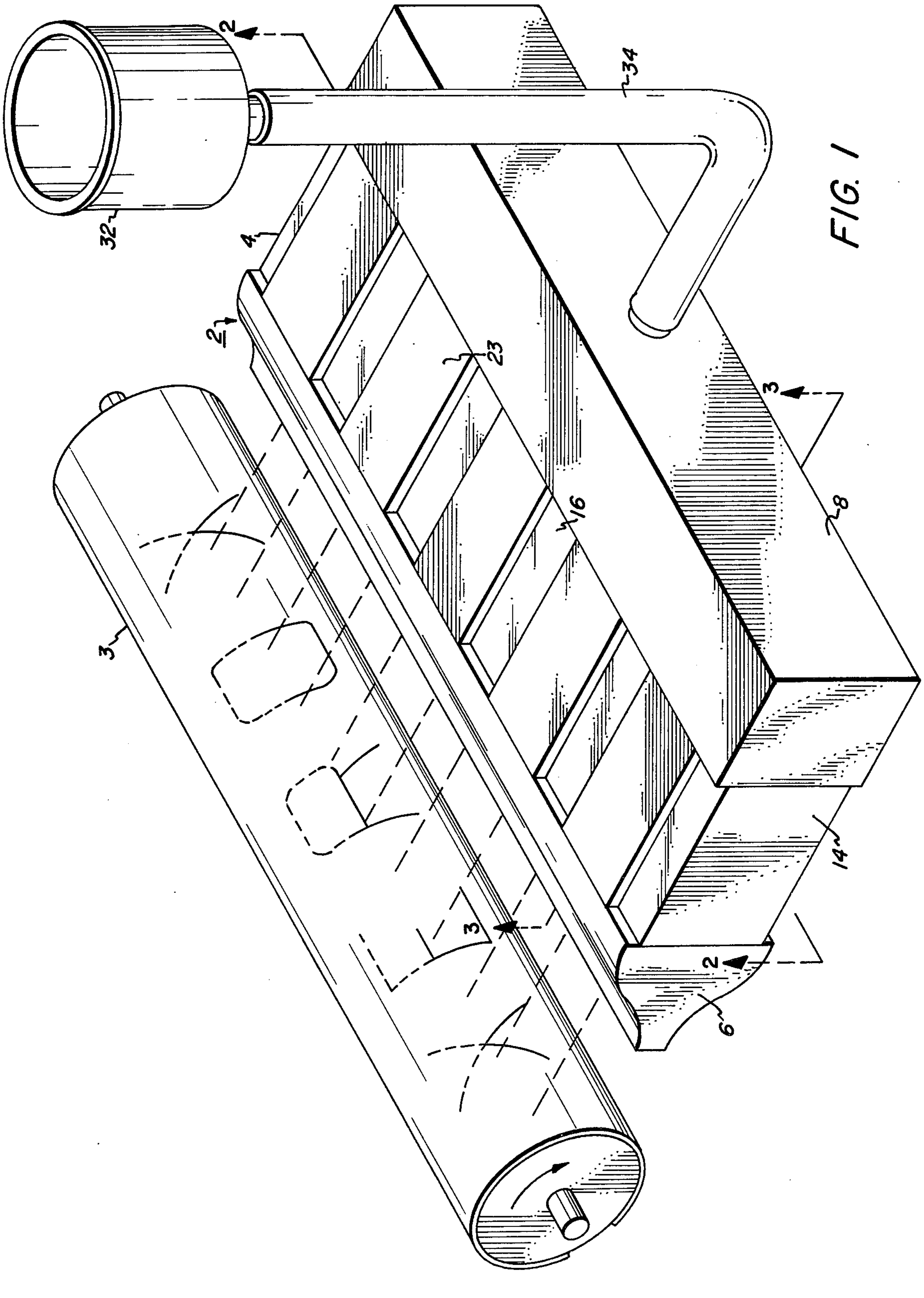
FIG. 1 is a perspective view of a multiple ink jet printing system.

Referring to FIGS. 1–3, there is shown a linear array of a multiple ink jet assembly 2 arranged opposite a rotating recording medium 3 for depositing ink droplets thereon. The assembly 2 comprises a deformable multilpe chamber unit 4, a multiple nozzle unit 6 attached to the front of the chamber unit 4 and a manifold reservoir unit 8 attached to the rear end of the chamber unit 4. The chamber unit 4 comprises a pair of flexible diaphragms, which comprise longitudinally extending flat ribbon bimetallic laminates 10, 12 separatd by a plurality of spaced high magnetic permeability spacer walls such as ferrite walls 14. Each ribbon comprises a laminate of two layers 16, 18 of different materials which have significantly different strain characteristics in the presence of a magnetic field, resulting in buckling of the laminated ribbon when such a field is applied thereto. An example of two such materials is nickel for layer 16 and an iron cobalt nickel alloy such as Supermendur for layer 18. The change in length, relative to its original length, is substantially greater for Supermendur than for nickel at any given magnetizing force. When buckling or deformation of the ribbon occurs, the Supermendur layer will form the longest surface (convex surface) of the ribbon in the buckling direction and the nickel layer will form the shortest surface (concave surface) of the ribbon in the buckling direction. A plurality of spaced thin copper platings 20, one between each pair of ferrite walls 14, are laminated to the layer 16 of each ribbon and a plurality of spaced thin copper platings 22, one between each pair of ferrite walls 14, are laminated to the layer 18 of each ribbon. Each plating 20, 22 is completely surrounded by a layer of insulating material 23. The ribbons 10, 12 are assembled with the ferrite walls 14 so the nickel layer 16 of each ribbon is the outer layer and the Supermendur layer 18 of each ribbon is the inner layer. The ferrite walls 14 are contiguous the ends of the insulated copper plates 22. The space between opposed pairs of copper plating 22 and adjacent ferrite walls 14 defines a plurality of deformable ink chambers 24, 24′ and 24″. The walls 14 are designed to remain rigid when the chambers are under pressure.

Referring to FIG. 4, the copper platings 20 and 22 for each chamber are connected in series with one another to an electrical source 25 in such a manner that the current flow through the copper platings 20 and 22 along a path in the general direction of the width of the chamber 24, which is transverse to the longitudinal direction. The series connected copper platings 20 and 22 of each chamber are connected in parallel to the series connected copper platings 20 and 22 of the other chambers so that each chamber may be separately addressed to selectively express ink droplets therefrom. When current is passed through the copper platings, the magnetic field lines will be perpendicular to the current flow or in the direction along the length of the chamber. The ferrite walls 14 not only serve as a wall of the deformable chamber 24 but also serve to "short circuit" the magnetic field lines or isolate (neglecting leakage field lines) the same within a respective chamber area when the same current is flowing through the copper platings 20, 22. The stress on the film laminates 10, 12 exerted by the magnetic field will be in a direction parallel to the direction of the magnetic field lines; thus in a longitudinal direction or along the length of the chamber 24.

Figure 5:
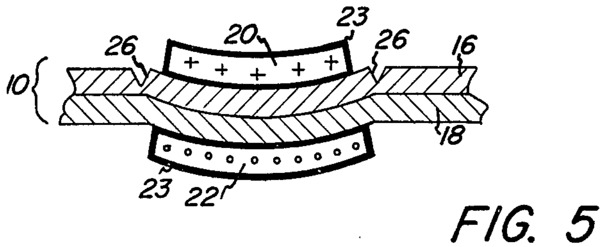
FIG. 5 is an enlarged view of a portion of a bimetallic ribbon laminate illustrated in FIG. 2.

Referring to FIG. 5, the unequal strain on layers 16, 18 caused by the stress exerted thereon will cause deformation or buckling of the laminates in the direction of the length, with the convex or longest surface 18 thereof facing the interior of the chamber 24, resulting in decreasing the volume of the chamber to express an ink droplet therefrom. The amount of deformation of the laminate out of its normal plane is designated by the dimension *d*. To facilitate ribbon flexing of each chamber section independently of its adjacent section, a plurality of longitudinally spaced V-notch hinges 26 are provided in layer 16. Each notch 26 extends across the entire width of the film and is aligned with a respective ferrite wall 14 (see FIG. 2).

The multiple nozzle unit 6 is of thin plastic wall construction and comprises a plurality of ink jet droplets orifices 28 separated by a wall therebetween. The nozzle unit is sealed to the front edge of the ribbons 10, 12 and the ferrite walls 14 with one orifice being communicated with one chamber.

The manifold ink reservoir unit 8 is also a thin plastic wall construction and is sealed to the back edge of the ribbons 10, 12 and the ferrite walls 14 and is communicated to the individual chambers 24 through a plurality of orifices 30. The reservoir orifice 30 is more restrictive to flow from the chamber than the droplet orifice 28 whereupon pressure developed in the chamber 24, due to deformation of the ribbons 10, 12 will express a droplet from the nozzle orifice 28 rather than force fluid back to the reservoir through orifice 30. Upon relaxation of the ribbons, fluid from the reservoir will replace the ink expressed from chamber 24. A primary reservoir 32 supplied the manifold reservoir through conduit 34 and may be kept at a pressure of about 6 inches of liquid.

In operation, current is selectively passed through the copper platings 20, 22 of various selected chambers to cause deformation of the laminate walls 10, 12 thereof to express ink droplets from the nozzle orifice 28 associated therewith to deposit ink droplets on the recording medium, in accordance with a desired image, as the recording medium 3 rotates therepast.

Figure 6:
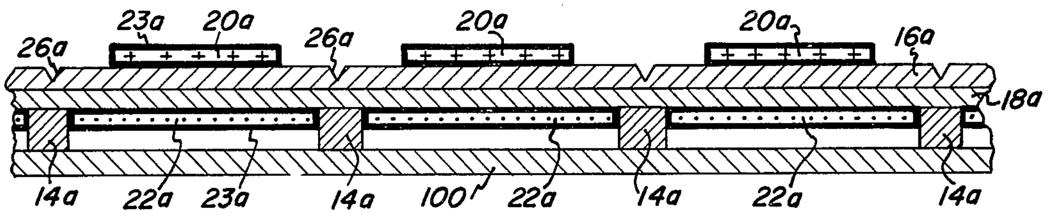
FIG. 6 is a view similar to FIG. 2 of a modification of the chamber unit embodiment of FIGS. 1–5.

Rather than utilize two bimetallic opposed films 10 and 12, as shown in the construction of FIGS. 1–5, a modified construction of a multiple chamber unit to be utilized in the ink jet assembly 2 is illustrated in FIG. 6. All elements, which are the same as the embodiment of FIGS. 1–5, are designated by the same reference numeral with an *a* affixed thereto. Only one bimetallic laminate film 10*a* is utilized in the chamber unit 4*a* and a magnetically permeable wall 100, such as soft iron core, is substituted from the film 12*a*. The chamber 24*a* is designed so the film 10*a* will deform to displace the same volume of fluid that films 10 and 12 jointly displaced upon buckling.

Figure 7:
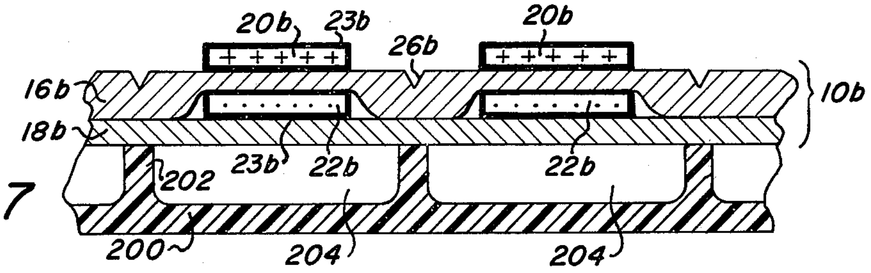
FIG. 7 is a view similar to FIG. 2 of another modification of the chamber unit embodiment of FIGS. 1–5.

Another embodiment of a multiple chamber unit to be utilized in the ink jet assembly 2 of FIGS. 1–5 is illustrated in FIG. 7 wherein all elements, which are the same as the embodiment of FIGS. 1–5, are designated by the same reference numeral with a *b* affixed thereto. In this embodiment, only one flexible diaphragm or ribbon laminate 10*b* is utilized. The copper plating 20*b* is secured to the nickel layer 16*b* as in the previous embodiments, but copper plating 22*b* is sandwiched between the nickel layer 16*b* and the Supermendur layer 18*b*. An elongated ribbon 200 has a plurality of longitudinally spaced walls 202 extending therefrom and integral therewith. The ribbon 200 and walls 202 define a plurality of channels 204. The channels 204 may be formed by molding, plating or etching. The material of the ribbon 200 and walls 202 is non-magnetic, such as glass or a plastic. The deformable laminate 10*b* is sealed to the walls 202 to form a plurality of chambers 204 out of the channels. In this embodiment, the magnetic field lines are confined to the immediate area of the particular laminate corresponding to the pair of copper platings 20*b*, 22*b* having the current passing therethrough. Rather than have only one ribbon laminate 10*b*, the other ribbon 200 could be constructed as a duplicate of ribbon 10*b*. The walls 202 would be non-magnetic and constructed separately from the ribbon 200.

Figure 8:
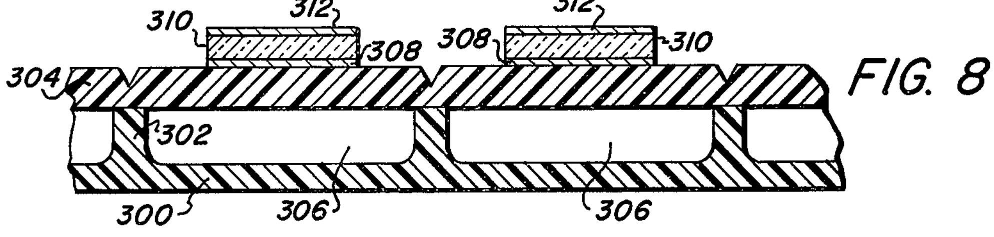
FIG. 8 is a similar view to FIG. 2 of still another modification of the chamber unit embodiment of FIGS. 1–5.

FIG. 8 illustrates another embodiment of a chamber unit construction to be utilized in the ink jet assembly 2. An elongated ribbon 300 has a plurality of longitudinally spaced walls 302 extending therefrom and integral therewith. A coextensive flexible ribbon 304 is sealed to the free ends of the walls 302. The ribbons and walls are of a non-electrically conductive material, such as glass or plastic, and may all be of the same material. A plurality of spaced chambers 306 are defined by a pair of walls 302 and the portion of each ribbon member therebetween. The chambers 306 may be formed by etching between the walls 302 or may be formed by molding the integral ribbon and wall structure. A plurality of longitudinally spaced electrically conductive layers 308 are deposited on the ribbon 304 with each conductive layer being between a pair of walls 302. A piezoelectric ceramic member or layer 310 is sandwiched between and bonded to the conductive layer 308 and another electrically conductive layer 312. The piezoelectric member 310 is polarized during the manufacture thereof to contract in a plane parallel to the plane of the ribbon 304 when excited by applying voltage potential across the conductive layers 308, 312. The contraction of the piezoelectric layer 310 will exert a likewise stress on a respective portion of the ribbon 301 to cause the ribbon to deform or buckle to decrease the volume of a respective chamber 306. Hinge notches 314 are provided to aid in the deformation of ribbon 304. Each of the conductive layers 308 and 312 for each chamber are connected in series with each other to an electrical source and the series connected conductive layers for each chamber are connected in parallel to the series connected conductive layers of the other chambers. As alternative constructions, the ribbons 304, 300 and walls 302 may be constructed as an integral unit or the ribbons 300, 304 and walls 302 may be produced separately and then assembled. Furthermore, a plurality of piezoelectric members may be applied to the outer surface of the ribbon 300 as well as to ribbon 304. In this case, the piezoelectric members on each ribbon will be located opposite each other.

The above embodiments all utilize a ribbon type of construction which permits one to obtain more closely spaced ink jets in a linear array than if each jet assembly were constructed separately and then placed in a linear array. This is highly desirable since the closer the spacing between jets, the better the printing resolution. The provision of a single flexible diaphragm with actuators affixed thereto permits a simplified method of assembling actuators to ink jets since a housing with chambers can be provided and the flexible member with the actuators already affixed thereto can be placed on top of the housing aligning the actuators with the chambers. The diaphragm is then sealed against the walls of the chambers to prevent fluid communication thereacross between adjacent chambers. A typical construction, will permit about 180 jets per inch, would be as follows with reference to the embodiment of FIGS. 1–5:

| | |
|---|---|
| Thickness of copper plating 20, 22 | 0.1 mil |
| Thickness of nickel layer 16 | 0.8 mil |
| Thickness of Supermendur layer 18 | 0.8 mil |
| Thickness of ferrite walls 14 | 1.5 mil |
| Length "L" of each chamber 24 | 4.0 mils |
| Width "W" of each chamber 24 | 200.0 mils |
| Deformation "d" of ribbons 10 and 12 out of the plane of no stress | 0.2 micron |
| Thickness of nozzle unit wall and manifold reservoir unit wall | 1.6 mils |
| Droplet size diameter | 6.0 mils |
| Overall height of unit | 5.2 mils |
| Force applied to ink | 100.0 psi |

From the above, it can be seen that a simple compact unit of a high density linear array of ink jets and chambers has been provided.

Figure 9:
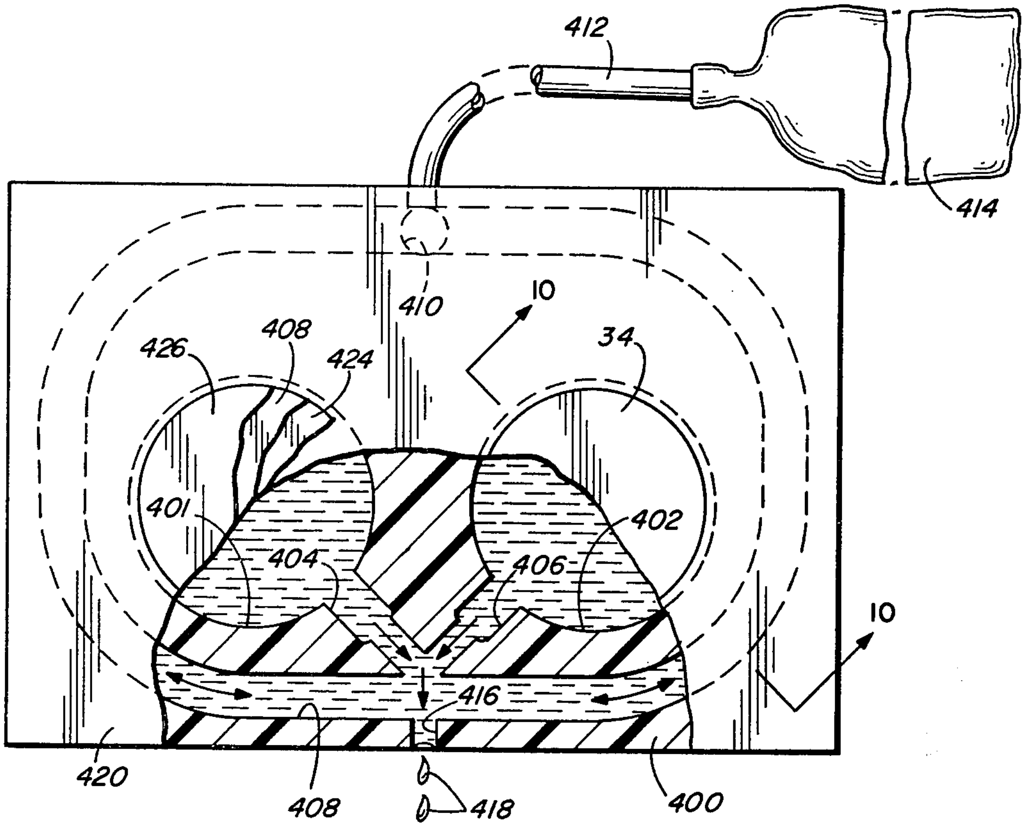
FIG. 9 is a partial cutaway view of a coincidence ink jet assembly.
Figure 10:
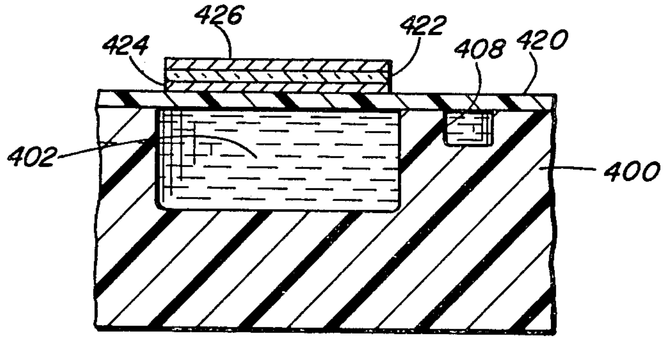
FIG. 10 is a view taken along section line 10—10 of FIG. 9.

The provision of a single flexible diaphragm (monolayer or bimetallic laminate) with actuators affixed thereto may be applied to a coincidence ink jet assembly, the principle of which is illustrated in FIGS. 9 and 10, but which in actual practice comprises an assembly of substantially fewer transducer chambers than the number of ink jets. A coincidence jet assembly is the subject matter of copending U.S. application Ser. No. 625,998 entitled "Coincidence Ink Jet," (common assignee), and comprises two liquid ink pressure passages and a droplet outlet orifice. Each of the pressure passages is communicated to a respective transducer. An ink droplet is expressed from the outlet orifice only when both pressure passages have a pressure pulse applied thereto simultaneously.

Referring to FIG. 9, a cutaway view of one member 400 of an ink jet housing assembly is shown, which has provided therein a pair transducer chambers 401 and 402. Fluid pressure passages 404 and 406 lead from the chambers 401, 402, respectively, to a liquid ink supply passage 408 where the three passages intersect. The liquid ink supply passage 408 is communicated to a port 410, which in turn is communicated through a conduit 412 to an ink supply reservoir 414, located remotely from the housing, which comprises a sealed flexible bag. Also, at the intersection is an outlet orifice 416 through which ink droplets 418 are expressed onto a copy medium.

Referring to FIG. 10, the chambers and passages are sealed by a flat flexible layer 420 bonded to the member 400. The transducer chambers 401, 402 and passages 404, 406 and 408 are completely filled with liquid ink. A piezoelectric ceramic member 422 is sandwiched between and bonded to a pair of electrodes 424 and 426 with the electrode 424 being bonded to the layer 420 thereby effectively bonding the piezoelectric member 422 thereto. The members 400 and 420 of the housing may be glass or plastic.

When the piezoelectric member for either transducer 401 or 402 is activated, a fluid pressure pulse will occur in a respective one of passages 404 and 406 causing displacement of ink along the respective passage. The passages 404 and 406 are at such an angle relative to the orifice 416, the impedance to liquid flow in passage 408 relative to the impedance to liquid flow in orifice 416, and the magnitude and duration of a pressure pulse exerted by the transducer chambers 401, 402 are designed that the ink stream expressed from only one passage at a time will entirely miss orifice 416 and displace the ink in the ink supply passage 408 while the ink within orifice 416 will not be disturbed to the extent of expressing a droplet therethrough. The orifice 416 is so located relative to the intersection of the passages 404, 406 and the magnitude and duration of the pressure pulse exerted by the transducer chambers 401, 402 are so designed that the summation vector of the fluid momentum vectors in passages 404 and 406 will lie on the axis of the orifice 416. Thus, only when the piezoelectric members for both transducer chambers 401, 402 are simultaneously activated, thereby applying a simultaneous pressure pulse in each of passages 404, 406 will an ink droplet 418 be expressed from orifice 416.

The aforedescribed coincidence ink jet has specific utilization in a matrix actuation system where a large number of jets are utilized or dense linear jet array utilized since substantially fewer transducer chambers than the number of jets utilized are required. Theoretically, since two independent transducer chambers are required to effect expression of an ink droplet through a jet, the number of transducer chambers required in a matrix actuation system is twice the square root of the number of jets. For example, theoretically, only 120 transducer chambers are needed for 3600 jets. Each jet orifice is communicated to two transducer chambers. However, as the number of jets increases in a system, the number of jets communicated to one transducer chamber will be hydraulically limited and, therefore, more transducer may be required. For instance, the practical number of transducers for a 3600-jet assembly may range between 120 and 400. In this instance, a housing would be provided with a plurality of open ended transducer chambers, each serving a number of ink jets. A flexible diaphragm with an actuator affixed thereto would be placed over the housing to span and seal the open ends of the chambers, as shown in FIGS. 9 and 10.

Obviously, instead of piezoelectric actuators and the flexible diaphragm, the magnetostrictive actuators and the associated laminated flexible member, as employed in the embodiments of FIGS. 1–7, may be utilized for the coincidence jet assembly.

What is claimed is:

1. In a linear array ink jet assembly having a plurality of deformable chambers each communicated with a respective one of a plurality of droplet outlet orifices and a respective one of a plurality of reservoir inlet orifices, said chambers comprising: a pair of elongated coextensive ribbon members spaced from and located opposite each other, at least one of said ribbon members being flexible and exhibiting deformation when in the presence of magnetic field lines; a plurality of longitudinally spaced walls located between said ribbon members and operably sealed thereto to form separate deformable chambers defined by said ribbon members and each adjacent pair of said walls; a plurality of longitudinally spaced electrically conductive means each operably secured to said one ribbon member, each of said conductive means being located between each pair of walls; means for passing electric current through each of said conductive means to produce magnetic field lines; and means for isolating the magnetic field lines produced by a particular conductive means to exert a stress on only a respective portion of said one ribbon member corresponding to said particular conductive means and thereby cause deformation thereof, whereby the volume of its respective said chamber is decreased to express an ink droplet through its respective said outlet orifice.

2. The structure as recited in claim 1 wherein said one ribbon member is a two-layer laminate of different materials, the layer of material facing the other of said ribbon members exhibiting greater elongation than the material of the other layer of the laminate when in the presence of magnetic field lines.

3. The structure as recited in claim 1 wherein said walls are integral with said other ribbon member.

4. The structure as recited in claim 2 wherein said walls are of high magnetic permeable material, said isolating means including said walls, and each of said plurality of electrically conductive means sandwich said ribbon laminate.

5. The structure as recited in claim 4 wherein said other ribbon member is of magnetic permeable material.

6. The structure as recited in claim 2 wherein said other of said ribbon member is a two-layer laminate of different materials, the layer of material of said other ribbon laminate facing said one ribbon member exhibiting greater elongation than the material of the other layer of said other ribbon laminate when in the presence of magnetic field lines; a plurality of longitudinally spaced electrically conductive means each being secured to said other ribbon laminate and each being located opposite a respective one of said first named plurality of electrically conductive means; means for passing current through each of said last named conductive means to produce magnetic field lines; and means for isolating the magnetic field lines produced by a particular last named conductive means to exert a stress on a respective portion of said other ribbon member laminate corresponding to said last named particular conductive means and thereby cause deformation thereof to additionally decrease the volume of its respective said chamber.

7. The structure as recited in claim 6 wherein said walls are of high magnetic material, said isolating means for each plurality of conductive means including said walls, and each of said pluralities of electrically conductive means sandwich its respective ribbon laminate.

8. The structure as recited in claim 7 wherein the current is passed through each of said conductive means in a direction transverse to the longitudinal direction of said ribbon members to thereby set up magnetic field lines in the longitudinal direction and stress a respective portion of the ribbon laminates in the longitudinal directon.

9. The structure as recited in claim 8 further comprising: a plurality of longitudinally spaced notches in said other layer of each of said laminates, the spacing of said notches being such as to include a respective one of said conductive means between adjacent pairs thereof, said notches extending for a substantial distance in a direction transverse to the longitudinal direction to provide a plurality of hinges about which the laminate section therebetween can deform.

10. The structure as recited in claim 2 wherein the current is passed through each of said conductive means in a direction transverse to the longitudinal direction of said ribbon members to thereby set up magnetic field lines in the longitudinal direction and stress a respective portion of said laminate in the longitudinal direction.

11. The structure as recited in claim 10 further comprising: a plurality of longitudinally spaced notches in said other layer of said laminate, the spacing of said notches being such as to include a respective one of said conductive means between adjacent pairs thereof, said notches extending for a substantial distance in a direction transverse to the longitudinal direction to provide a plurality of hinges about which the laminate sections therebetween can deform.

12. The structure as recited in claim 1 wherein said one ribbon member is the only one of said ribbon members with electrically conductive means thereon.

13. The structure as recited in claim 2 wherein said one layer is iron cobalt nickel alloy.

14. The structure as recited in claim 13 wherein said other layer is nickel.

15. The structure as recited in claim 1 wherein said other ribbon member and said walls are of non-magnetic permeable material.

16. The structure as recited in claim 10 wherein said other ribbon member and said walls are of non-magnetic permeable material.

17. In a linear array ink jet assembly having a plurality of deformable chambers each communicated with a respective one of a plurality of droplet outlet orifices and a respective one of a plurality of reservoir inlet orifices, said chambers comprising: a pair of elongated coextensive ribbon members spaced from and located opposite each other; a plurality of longitudinally spaced walls located between said ribbon members and operably sealed thereto to form separate deformable chambers defined by said ribbon members and each adjacent pair of said walls; each of said droplet outlet orifices being located between each pair of walls; a plurality of longitudinally spaced piezoeletric members, each operably secured to one of said ribbon members; said one ribbon member being flexible; each of said piezoelectric members being located between each pair of walls; means for applying a voltage potential across each of said piezoelectric members to excite the same in a direction generally along the plane of said one ribbon member; said piezoelectric members being arranged on said one ribbon member that when excited, each will cause deformation of a respective portion of said one ribbon member and decrease the volume of its respective said chamber to express an ink droplet through a respective said outlet orifice.

18. The structure as recited in claim 17 further comprising: a plurality of longitudinally spaced notches in the outer surface of said one ribbon member, the spacing of said notches being such as to include a respective one of said piezoelectric members between adjacent pairs thereof, said notches extending for a substantial distance in a direction transverse to the longitudinal direction to provide a plurality of hinges about which said one ribbon sections therebetween can deform.

19. In a linear array ink jet assembly: a longitudinally extending housing having a plurality of chambers, each separated from the other by longitudinally spaced wall means; a flexible member spanning said chambers and wall means and operably engaging said wall means to form a seal therebetween; a plurality of spaced-apart actuating means affixed to said flexible member, each of said actuating means being affixed to respective portions of said flexible member corresponding to a respective chamber; each chamber including a droplet orifice longitudinally located between a respective pair of said wall means; said actuating means and said flexible member being so constructed and arranged that upon activation of said actuating means, its respective portion of said flexible member will deform to decrease the volume of its respective chamber.

20. In an ink jet assembly of claim 19 wherein said flexible member is a two-layer laminate of different materials, one of which exhibits greater elongation than the other when in the presence of magnetic field lines, said actuating means producing magnetic field lines when actuated.

21. In an ink jet assembly of claim 19 wherein said actuating means includes piezoelectric crystals.

* * * * *

UNITED STATES PATENT AND TRADEMARK OFFICE

CERTIFICATE OF CORRECTION

PATENT NO. : 4,032,929

DATED : June 28, 1977

INVENTOR(S) : Kenneth H. Fischbeck and Richard H. Vernon

It is certified that error appears in the above-identified patent and that said Letters Patent are hereby corrected as shown below:

Column 4, line 20, change "301" to --304--.

Column 7, line 25, after "magnetic" insert --permeable--.

Signed and Sealed this

*Twenty-fifth* Day of *October 1977*

[SEAL]

*Attest:*

RUTH C. MASON
*Attesting Officer*

LUTRELLE F. PARKER
*Acting Commissioner of Patents and Trademarks*